Patented Oct. 7, 1941

2,258,444

UNITED STATES PATENT OFFICE 2,258,444

RECOVERY PROCESS

Robert F. Cockerill, Elsmere, Del., assignor to E. I. du Pont de Nemours & Company, Wilmington, Del., a corporation of Delaware No Drawing. Application November 24, 1939, Serial No. 305,935

10 Claims. (Cl. 202—52)

This invention relates to a process for the recovery of ethylene glycol from solutions containing it and more particularly to its recovery from solutions containing esters of hydroxy acetic acid.

Various methods have been proposed for the preparation of ethylene glycol. Among them are a number of processes which involve the hydrogenation of the alkyl esters of hydroxy acetic acid, such hydrogenations being conducted with the aid of catalysts and in either the liquid or vapor phase. As would be expected, the reaction is generally not quantitative and as a result the reaction product usually contains, in addition to the ethylene glycol, various amounts of unreacted hydroxy acetic acid ester, as well as the monohydric alcohol formed as a result of the hydrogenation. The boiling point differences between the monohydric alcohol, hydroxy acetic acid ester and ethylene glycol are such that recovery by fractional distillation would appear to be simple and effective. The recovery of the constituents of such a mixture by normal distillation, however, has been so low that, prior to this invention, this procedure was not entirely satisfactory.

An object of the present invention is to provide a process for the recovery of ethylene glycol from solutions containing it and esters of hydroxy acetic acid. Another object of the invention is to provide a process wherein losses of hydroxy acetic acid esters and ethylene glycol during their separation from mixtures containing them are inhibited. Yet another object of the invention is to provide conditions wherein chemical reactions during distillation of a mixture containing ethylene glycol and esters of hydroxy acetic acid, in the presence or absence of monohydric alcohols, are minimized. Other objects and advantages of the invention will hereinafter appear.

The above and other objects are realized by carrying out the recovery of ethylene glycol from its solution with an ester of hydroxy acetic acid by distillation under carefully controlled conditions. It would be expected that during distillation of such a mixture the ester of hydroxy acetic acid would be completely vaporized at one temperature and the ethylene glycol at another temperature. It has been found, however, that in addition to simple distillation, chemical reactions occur under normal distillation conditions which prevent a clean separation, and as a result considerable amounts of ester and glycol are lost.

The decomposition during distillation of an alkyl ester of hydroxy acetic acid in the presence of ethylene glycol arises, it is believed, from at least two sources. First, an ester interchange appears to take place between the ester and the ethylene glycol giving glycol hydroxy acetate, and, second, the ester condenses with itself to form polyglycolide. These reactions are believed to be responsible for a major portion of the recovery losses, although there is a possibility that other reactions are involved.

In accord with the process of this invention, it has been found that the recovery can be carried out by distillation and without uneconomical loss of the ethylene glycol produced or of the ester of hydroxy acetic acid unreacted, providing the polyhydric alcohol and ester are not permitted to remain in liquid phase contact with each other for any appreciable period of time under the reaction conditions which are favorable to the ester interchange reaction and/or the condensation reaction. This may be accomplished by the flash distillation of the mixture, that is, by effecting the distillation in such a manner that the constituents are flash-distilled from a vaporization surface, e. g., by contacting a small amount of the liquid mixture, at substantially atmospheric pressure, with a surface which is 5° to 10° C. above the initial boiling point of the mixture. The resulting vapors will be richer in the lower boiling constituent than the liquid mixture before vaporization. By repeating this operation, effective separation can be accomplished without appreciable losses due to the aforesaid reactions. Other methods may likewise be used for effecting the same result. It has been found that losses can be substantially eliminated in the distillation of a mixture containing an ester of hydroxy acetic acid and ethylene glycol when the maximum temperature of a mixture of these constituents, existing in the liquid phase, is less than 125° C. and with inconsequential losses when less than 150° C., if the time of contact in that phase is not appreciably more than one hour. In other words a liquid mixture of the ester and ethylene glycol should not remain in contact when the temperature of the mixture is above 150° C., and preferably above 125° C., for more than one hour, for otherwise considerable losses occur.

These requirements can be met by subjecting the ester-glycol mixture to distillation in a batch process, wherein the distillation is conducted under sub-atmospheric pressures below at least 125 mm. and preferably below 50 mm. pressure. Under these pressures, the temperature of distillation and the rates of the reaction are so low that substantially no esterification or condensation occurs.

If the separation is conducted by a continuous distillation process using a distillation column provided with a plurality of plate sections, substantially the same effect can be realized by limiting the hold-up on the plates of the column to a minimum amount and, preferably, to not more than ½ to 1 inch of liquid and also maintaining the pressure below approximately 200 mm. Since the volume of liquid on any given plate is relatively small, it is evident that the time of contact on that plate will be relatively short and, consequently, a somewhat higher temperature (i. e., in the proximity of 150° C.) is permissible for continuous distillation than for bath distillation. Hence, as the temperature varies substantially directly with the pressure, the pressure for continuous distillation may be somewhat higher.

It has been emphasized that the esterification of the glycol with the esters of hydroxy acetate takes place but slowly in the vapor phase, in the absence of catalysts and that the condensation of the alkyl hydroxy acetate with itself likewise does not take place appreciably in the vapor phase. Accordingly, these reactions, in a continuous recovery system or in the batch process, occur to an appreciable extent only when the ethylene glycol and ester are on the plates of the former, in the still pot of the latter, are in the calandria, or are in any other part of the apparatus wherein they are present in the liquid phase. Consequently, by limiting the amount of the liquid constituents on the plates of a column, the time of contact between them is reduced to the least possible period and the esterification and condensation reactions inhibited. Furthermore, it is of advantage to introduce the mixture of ester and ethylene glycol on a plate well above the calandria, preferably on the center plate of the column, in order that substantially no mixture of these compounds collects in the calandria. In the batch distillation the pressure must be lowered to such an extent, as has been emphasized, that the reaction rate is slower than the rate of removal of the constituents by distillation.

It has been indicated that the process of this application is particularly well suited for the recovery of ethylene glycol from admixture with alkyl hydroxy acetates, which mixtures are, for example, obtained as the product of the hydrogenation of the alkyl hydroxy acetates. Such hydrogenations give a crude product containing, in addition to ethylene glycol and unrecated ester, a monohydric alcohol which results from the hydrogenation of the alkoxy group of the ester. The alcohol, however, does not complicate the recovery of the ethylene glycol or ester as the alcohol may be distilled from the crude product under the same conditions. The lower alcohols, such as methanol, ethanol, propional, isobutanol and the like, obtained in reaction products from the hydrogenation of methyl, ethyl, propyl and isobutyl hydroxy acetate, respectively, usually boil well below the ester and ethylene glycol. The same recovery procedure may be used as for mixtures containing only the ester and ethylene glycol, if desired, since the esterification and condensation reactions take place, although apparently to not so great an extent, in the presence, as well as in the absence, of these alcohols. The presence of a monohydric alcohol, however, seems to inhibit somewhat the reactions and little loss of ester will occur during their removal if the monohydric alcohol present is removed at pressures up to atmospheric pressures, providing, however, that at temperatures above 150° C., and preferably above 125° C., the time of contact in the liquid phase is not appreciably over one hour.

In addition to the recovery of ethylene glycol from such crude reaction mixtures already described, the process of the invention is likewise applicable to the recovery of ethylene glycol from its solution with ethyl, N-propyl, isopropyl, N-butyl, isobutyl, amyl and the higher alkyl esters of hydroxy acetic acid in the presence or absence of an alcohol corresponding to the ester group of the acids designated.

The more detailed practice of the invention is illustrated by the following examples in which parts are given by weight unless otherwise stated. There are, of course, many forms of the invention other than these specific embodiments.

*Example 1.*—A crude product containing 998 parts of a mixture containing, in mole per cent, 44.3% methanol, 11.3% methyl hydroxy acetate and 44.3% ethylene glycol was subjected to distillation at atmospheric pressure. The temperature in the still pot during the distillation reached a maximum of 158° C. and the liquid mixture was at that temperature for over one hour. It was found that 29.3% of the methyl hydroxy acetate and an appreciable amount of ethylene glycol were lost to glycolide or glycol hydroxy acetate, or both.

*Example 2.*—A crude product containing 789 parts of a mixture containing, in mole per cent, 23% methyl hydroxy acetate and 77% ethylene glycol was distilled at 20 mm. pressure with a maximum still pot temperature of 108° C. Only about 4.7% of the methyl hydroxy acetate and substantially no ethylene glycol were lost due to esterification and condensation.

*Example 3.*—A still pot was charged with 1970 parts of a crude product from the hydrogenation of methyl hydroxy acetate in accord with the process described in the copending application of D. J. Loder, Serial No. 171,891, the product containing, on a weight percentage basis, approximately 4.3% methyl hydroxy acetate, 1.9% water, 59.8% ethylene glycol and 35% methanol. At a pressure of 300 mm. and a pot temperature ranging up to 125° C., substantially all of the methanol was distilled over, the pressure was then dropped to 100 mm., the pot temperature ranging up to 143° C., under which conditions the methyl hydroxy acetate was distilled over. Substantially all of the ethylene glycol, methyl hydroxy acetate, and methanol was recovered with a loss of but 1.2 per cent of glycol and ester.

*Example 4.*—A crude reaction mixture similar to the product treated in Example 3, which contained 13.3% methyl hydroxy acetate, 1.3% water, 49.4% ethylene glycol and 36% monohydric alcohol, was charged into a still pot provided with a fractionating column and the distillation conducted at a pressure of 1 atmosphere. The hold-up in the still pot was approximately 3½ minutes and the temperature approximately 138° C. The distillate which contained approximately 9,866 parts constituted 29.8% of the original feed, this being substantially all the methanol contained therein. The residue constituted approximately 23,266 parts, 17.5% of which was methyl hydroxy acetate.

This residue was introduced into a second distillation apparatus similar to the first and the distillation conducted therein at a pressure of 200 mm. The hold-up in the still pot in this instance was approximately 7½ minutes and the pot temperature approximately 160° C. The distillate contained 7.6% water, 0.8% ethylene glycol, 68.6% methyl hydroxy acetate, and 24% monohydric alcohols. The residue contained 1.9% water, 91.0% ethylene glycol, 2.0% methyl hydroxy acetate and 5.1% undetermined.

As a result of this over-all distillation process, in the first stage of which the methanol being recovered, and in the second stage the methyl hydroxy acetate separated from the ethylene glycol, the loss of methyl hydroxy acetate which appears in the residue of the last distillation constituted but 8% of the methyl hydroxy acetate fed into the first distillation stage.

From a consideration of the above specification, it will be appreciated that many changes may be made in the details therein given without departing from the scope of the invention or sacrificing any of the advantages that may be derived therefrom.

I claim:

1. A process of recovering the constituents present in a mixture containing a hydroxy acetic acid ester and ethylene glycol during which condensation of the hydroxyacetic acid ester with itself and reaction of the hydroxyacetic acid ester with ethylene glycol are inhibited, which comprises effecting the separation of the hydroxy acetic ester from the ethylene glycol by distillation at temperatures under 150° C. and at a pressure below 300 mm. the ester and glycol being in liquid phase contact with each other for not appreciably more than 1 hour.

2. A process of recovering constituents present in a solution containing a hydroxy acetic acid ester and ethylene glycol during which condensation of the hydroxyacetic acid ester with itself and reaction of the hydroxyacetic acid ester with ethylene glycol are inhibited, which comprises effecting the separation of the hydroxy acetic acid ester from the ethylene glycol by batch distillation conducted under pressures below approximately 125 mm. and at temperatures below 150° C., the ester and glycol being in liquid phase contact with each other for not appreciably more than one hour.

3. A process of recovering constituents present in a solution containing hydroxy acetic acid ester and ethylene glycol during which condensation of the hydroxyacetic acid ester with itself and reaction of the hydroxyacetic acid ester with ethylene glycol are inhibited, which comprises effecting the separation of the hydroxy acetic acid ester from the ethylene glycol, by continuous distillation in a fractionating column at pressures below approximately 200 mm. and at temperatures below 150° C., the ester and glycol being in liquid phase contact with each other for not appreciably more than one hour.

4. A process of recovering constituents present in a solution containing methyl hydroxy acetate and ethylene glycol during which condensation of the methyl hydroxy acetate with itself and reaction of the methyl hydroxy acetate with ethylene glycol are inhibited, which comprises effecting the separation of the methyl hydroxy acetate from the ethylene glycol by distillation at temperatures under 150° C., and pressures below 300 mm., the methyl hydroxy acetate and ethylene glycol being in liquid phase contact with each other for not appreciably more than 1 hour.

5. A process of recovering constituents present in a solution containing ethyl hydroxy acetate and ethylene glycol during which condensation of the ethyl hydroxy acetate with itself and reaction of the ethyl hydroxy acetate with ethylene glycol are inhibited, which comprises effecting the separation of the ethyl hydroxy acetate from the ethylene glycol by distillation at temperatures under 150° C., and pressures below 300 mm., the ethyl hydroxy acetate and ethylene glycol being in liquid phase contact with each other for not appreciably more than 1 hour.

6. A process of recovering constituents present in a solution containing isobutyl hydroxy acetate and ethylene glycol during which condensation of the isobutyl hydroxy acetate with itself and reaction of the isobutyl hydroxy acetate with the ethylene glycol are inhibited, which comprises effecting the separation of the isobutyl hydroxy acetate from the ethylene glycol by distillation at temperatures under 150° C., and pressures below 300 mm., the isobutyl hydroxy acetate and ethylene glycol being in liquid phase contact with each other for not appreciably more than 1 hour.

7. A process for the recovery of the constituents present in a crude reaction mixture resulting from the hydrogenation of a hydroxy acetic acid ester to ethylene glycol which comprises distilling the crude reaction mixture for the recovery of the monohydric aliphatic alcohol present and subsequently separating the hydroxy acetic acid ester from the ethylene glycol by batch distillation at pressures below approximately 125 mm. and at temperatures below 150° C., the ester and glycol being in liquid phase contact with each other for not appreciably more than one hour.

8. A process for the recovery of the constituents present in a crude reaction mixture resulting from the hydrogenation of a hydroxy acetic ester to ethylene glycol which comprises distilling the crude reaction mixture for the recovery of the monohydric aliphatic alcohol present and subsequently separating the hydroxy acetic acid ester from the ethylene glycol by continuous distillation at pressures below approximately 200 mm. and at temperatures below 150° C., the ester and glycol being in liquid phase contact with each other for not appreciably more than one hour.

9. A process for the recovery of constituents present in a mixture containing methyl hydroxy acetate, ethylene glycol and methanol which comprises distilling off the methanol at a pressure of substantially 300 mm. and a maximum pot temperature ranging up to approximately 125° C., leaving as a residue a mixture of methyl hydroxy acetate and ethylene glycol, separating the methyl hydroxy acetate from that mixture by distillation at a pressure of 100 mm. and at a maximum pot temperature ranging up to approximately 143° C. and finally recovering the ethylene glycol from the residue.

10. In a process for the recovery by distillation of the constituents present in a solution containing a hydroxy acetic acid ester and ethylene glycol during which condensation of the hydroxyacetic acid ester with itself and reaction of the hydroxyacetic acid ester with ethylene glycol are inhibited, wherein there is substantially no reaction between the ester and glycol to form glycol hydroxy acetates and substantially no condensation of the hydroxy acetic acid ester with itself to form glycolides, the steps which comprise effecting the separation of the hydroxy acetic acid ester from the ethylene glycol by fractional distillation at temperatures under 150° C. and pressures below 300 mm., the ester and glycol being in liquid phase contact with each other for not appreciably more than 1 hour.

ROBERT F. COCKERILL.

CERTIFICATE OF CORRECTION.

Patent No. 2,258,444. October 7, 1941.

ROBERT F. COCKERILL.

It is hereby certified that error appears in the printed specification of the above numbered patent requiring correction as follows: Page 2, first column, line 47, for "unrecated" read --unreacted--; page 3, second column, line 33, claim 8, after "acetic" insert --acid--; and that the said Letters Patent should be read with this correction therein that the same may conform to the record of the case in the Patent Office.

Signed and sealed this 25th day of November, A. D. 1941.

(Seal)

Henry Van Arsdale,
Acting Commissioner of Patents.